United States Patent Office 3,359,080
Patented Dec. 19, 1967

3,359,080
PREPARATION OF PHOSPHONITRILIC CHLORIDE POLYMERS
Frederick Arthur Ridgway, Stourbridge, and Harold Trevor Searle, Sutton Coldfield, England. assignors to Hooker Chemical Corporation, Niagara Falls, N.Y., a corporation of New York
No Drawing. Filed Aug. 7, 1962, Ser. No. 215,281
Claims priority, application Great Britain, Aug. 14, 1961, 29,280/61
4 Claims. (Cl. 23—357)

This invention is for improvements in or relating to a method of manufacture of phosphonitrilic chloride polymers whereby a high yield of the lower cyclic phosphonitrilic chloride polymers is obtained.

Cyclic phosphonitrilic chloride polymers are valuable, for example, as constituents of thermally resistant resins as disclosed more fully in U.S. patent specification No. 2,866,773 and as intermediates for insecticidally active compounds as disclosed more fully in U.S. patent specification No. 2,858,306. As is already shown, the trimer is the most useful for these purposes. The trimer is of particular value for use in reactions with phenolic compounds to produce resins, since the higher polymers may give rise to too great a degree of cross-linking. Moreover, the trimer is the easiest of the cyclic polymers to separate in pure form.

In our co-pending application U.S. S.N. 807,749, filed April 21, 1956, and now abandoned, we describe a process for the production, in high yield, of lower phosphonitrilic chloride polymers, particularly the trimer, which comprises bringing phosphorus pentachloride into contact with at least an equimolecular proportion of ammonium chloride in a solvent at reflux temperature, the major portion of the phosphorus pentachloride being brought into contact with the ammonium chloride progressively over at least the major part of the time during which reaction takes place.

Our co-pending application U.S. S.N. 807,748, filed April 21, 1959, and now abandoned, also describes a process for the production, in high yield, of lower cyclic phosphonitrilic chloride polymers by the reaction of phosphorus pentachloride with ammonium chloride. The process consists in carrying out the reaction in the presence of a co-ordinating metallic salt as catalyst, suitable catalysts being metal salts which form coordination complexes with ammonia or an amine, for example cobaltous chloride, aluminium chloride and cupric chloride.

Phosphorus pentachloride is a relatively expensive reagent and we have discovered that it is possible to use the considerably cheaper phosphorus trichloride as the source of phosphorus in the above described process for making phosphonitrilic chloride polymers. This is due to the unexpected fact that if phosphorus trichloride, chlorine and ammonium chloride are brought together the chlorine reacts preferentially with the phosphorus trichloride to produce phosphorus pentachloride which then reacts with the ammonium chloride to produce phosphonitrilic chloride polymers, in particular, lower cyclic phosphonitrilic chloride polymers, in good yield.

A further advantage of the above procedure follows from the fact that one of the reagents, namely chlorine, is a gas. It will therefore of necessity be added over a period of time, with the result that phosphorus pentacholride is formed and is brought into contact with the ammonium chloride progressively over a similar period of time. The process therefore fulfills the desideratum disclosed in our above mentioned patent application U.S. S.N. 807,749 as favouring the production of the lower cyclic polymers of phosphonitrilic chloride.

Accordingly, the invention consists in a process for the production of cyclic phosphonitrilic chloride polymers which comprises bringing into contact elemental chlorine, phosphorus trichloride and ammonium chloride in an inert solvent at reflux temperature, the ammonium chloride being present at any time during the reaction in a proportion at least equimolar with the phosphorus trichloride.

The chlorine and phosphorus trichloride may be added to the ammonium chloride solvent mixture simultaneously but it is more convenient to add all the phosphorus trichloride to the ammonium chloride solvent mixture at the outset and then introduce the chlorine gradually. In either case it is advantageous to pass the chlorine, or the chlorine and phosphorus trichloride, into the refluxing mixture over a period of time ranging from the first half to substantially the total time during which reaction takes place, whereby a high yield of lower cyclic polymers, especially the trimer, is produced.

Alternatively it is possible to carry out the process continuouly, by introducing the ammonium chloride, phosphorus trichloride and chlorine continuously into the refluxing solvent, provided the ammonium chloride is at all times present in a proportion at least equimolecular with the phosphorus trichloride. This procedure also results in high yields of the lower cyclic polymers, especially the trimer.

We have also found that a high yield of cyclic phosphonitrilic chloride trimer is obtained if the rate of addition of chlorine to phosphorus trichloride and ammonium chloride in the presence of a hot solvent is controlled as a function of the theoretical rate of hydrogen chloride evolution occurring according to the equation:

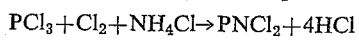

$$PCl_3 + Cl_2 + NH_4Cl \rightarrow PNCl_2 + 4HCl$$

in such a manner that the mean hydrogen chloride evolution rate is from 40% to 100% of the theoretical rate, and is held as close as possible to the theoretical value.

Ideally, the rate of addition of chloride should be equal to the rate of evolution of HCl. The maximum theoretical HCl evolution rate is that which would occur if the $PCl_5$ formed reacted instantaneously as it is formed with the ammonium chloride in the reaction mixture. As the HCl evolution rate deviates farther from the maximum theoretical value, the yields of cyclic phosphonitrilic chloride and particularly the trimer diminish. It is believed that as the chlorine addition rate is increased for any given set of reaction conditions, such as particle size of the ammonium chloride etc. the available phosphorus pentachloride is utilised too slowly and a resulting high concentration of phosphorus pentachloride in the reaction solution causes the formation of more linear phosphonitrilic chloride polymers. Control of the reaction can be achieved by regulating the rate of chlorine addition so that the actual rate of hydrogen chloride evolution is at least 40% of the theoretical hydrogen chloride evolution rate.

In general, the reaction is carried out by passing chlorine into a refluxing mixture of phosphorus trichloride and ammonium chloride in an inert solvent at a temperature between 100° and 160° C. The solvent used must be inert to chlorination and suitable solvents are phosphorus oxychloride and halogenated hydrocarbons, preferably symmetrical tetrachloroethane, monochlorobenzene, o-dichlorobenzene, or benzyl chloride. The chlorine is conveniently obtained from a chlorine cylinder and can be metered into the reaction mixture by continually weighing the cylinder or by other convenient means. The progress of the reaction may be checked by determining the HCl evolved at various stages. The addition of chlorine is stopped when the stoichiometric amount for reaction with the phosphorus trichloride in accordance with the equation given above, has been added. This stage of the reaction is easily recognized since the excess chlorine can be detected in the gases evolved from the reaction. The reaction mixture is then refluxed further until the reaction of phosphorus pentachloride and ammonium chloride is substantially complete i.e. when hydrogen chloride ceases to be evolved. Any excess ammonium chloride is then filtered off and the product separated by distilling off the solvent.

The speed of the reaction may be increased by adding a catalyst such as a co-ordinating metallic salt by which is meant a metallic salt which forms a co-ordination complex with ammonia or an amine. Suitable salts are described in our co-pending application U.S. S.N. 807,748 and include, for example, cobaltous chloride, aluminium chloride and cupric chloride. The reaction can also be accelerated by increasing the excess of ammonium chloride present or (as described below) by having the ammonium chsoride present in very finely divided form. In the absence of any of these expedients, the reaction is a slow one and its completion is asymptotic with respect to time. In such a case it is impracticable to extend the chlorine addition until the reaction is 100% complete. The time over which the addition extends should, however, not be less than 50% of the total time for which the reaction is continued, but preferably is more than the first three quarters of the reaction time. This total time, where no expedients for accelerating the reaction are employed, represents substantial (at least 95%) completion of the reaction. The stage reached by the reaction at any time can readily be determined by collecting the hydrogen chloride evolved and estimating the total quantity evolved up to that time.

As indicated above, it is advantageous to use very finely divided ammonium chloride, since this accelerates the reaction at all stages. Preferred values for the specific surface of this material are greater than 1000 sq. cms./gm. In addition to or instead of this expedient it is also advantageous, for the purpose of accelerating the reaction, to use a substantial excess, for example a molecular excess of more than 10%, of ammonium chloride.

The following example serves to illustrate the invention:

137.5 grams (1.0 mole) phosphorus trichloride and 58.8 grams (1.1 moles) finely divided ammonium chloride were heated to boiling point in 0.5 litre symmetrical tetrachloroethane in a flask fitted with a reflux condenser. 72 grams (1.0 mole) chlorine gas were passed slowly into the refluxing mixture over a period of 4¾ hours: chlorine gas was then detected in the by-product hydrogen chloride gas and the addition was stopped. The mixture was then refluxed for a further 2¼ hours approximately until the evolution of hydrogen chloride had substantially ceased and the reaction was substantially complete. After cooling, the excess ammonium chloride was filtered off. The solvent was distilled off from the filtrate to give 109 grams (94%) of a mixture of phosphonitrilic chloride containing approximately 17% linear phosphonitrilic chlorides, 59% trimeric phosphonitrilic chloride, 10% tetrameric phosphonitrilic chloride and 14% higher cyclic phosphonitrilic chlorides.

What we claim is:

1. A process for the production of cyclic phosphonitrilic chloride polymers which comprises bringing into contact elemental chlorine, phosphorus trichloride and ammonium chloride in an inert solvent selected from the group consisting of symmetrical tetrachloroethane, monochlorobenzene, o-dichlorobenzene, benzyl chloride and phosphorus oxychloride at reflux temperature, the ammonium chloride being present at any time during the reaction in a proportion which is in a molecular excess of at least 10 percent of the phosphorus trichloride and in a state of division such that its specific surface is at least 1,000 square centimeters per gram, and wherein the phosphorus trichloride is present initially in the ammonium chloride solvent mixture.

2. A process according to claim 1 wherein the major part of the chlorine is added evenly over a period of time ranging from the first half to substantially the whole of the time during which reaction takes place.

3. A process according to claim 2 wherein the major part of the chlorine is added over a period ranging from three quarters to substantially the total time during which the reaction takes place.

4. A process according to claim 1 wherein the addition of the chlorine to the phosphorus trichloride and ammonium chloride is regulated so that the rate of hydrogen chloride evolution is from 40% to 100% of the theoretical rate according to the equation:

$$PCl_3 + Cl_2 + NH_4Cl \rightarrow PNCl_2 + 4HCl$$

References Cited

UNITED STATES PATENTS

| 1,906,440 | 5/1933 | Wirth | 23—205 |
|---|---|---|---|
| 2,782,133 | 2/1957 | Vallette | 23—14 X |

FOREIGN PATENTS

| 1,220,715 | 1/1960 | France. |
|---|---|---|
| 905,314 | 9/1962 | Great Britain. |

OTHER REFERENCES

Groggens et al.: "Unit Processes in Organic Synthesis," 5th edition, 1968, pp. 40–43.

MILTON WEISSMAN, *Primary Examiner.*